Patented Jan. 18, 1949

2,459,518

UNITED STATES PATENT OFFICE 2,459,518

PARENTERAL SOLUTIONS OF RIBOFLAVIN AND THE LIKE

Tillman D. Gerlough, Highland Park, and Emil L. Smith, New Brunswick, N. J., assignors to E. R. Squibb & Sons, New York, N. Y., a corporation of New York No Drawing. Application June 27, 1946, Serial No. 679,857

5 Claims. (Cl. 167—81)

This invention relates to parenteral (i. e., parenterally-administrable) solutions of 9-polyhydroxyalkyl-iso-alloxazins, especially riboflavin (6,7-dimethyl-9-d-ribityl-iso-alloxazin).

The parenteral solutions of 9-polyhydroxyalkyl-iso-alloxazins heretofore available have been unsatisfactory for various reasons, as illustrated by the case of riboflavin, for example. The solubility of riboflavin in water is about 125 micrograms per ml. Supersaturated solutions containing as high as about 250 micrograms per ml. have been prepared; but the riboflavin content of such solutions is still so low as to necessitate the administration of a parenterally-undesirable volume of solution. Relatively high-concentration solutions have been obtained by dissolving the riboflavin in aqueous solutions of certain substances, inter alia, urea, N-methylacetamide, acetamidine hydrochloride, liver extract, and nicotinic acid amide; but none of these riboflavin solutions have been found wholly satisfactory. Thus, some of them are unstable, particularly when sterilized by heating; some of the substances used to solubilize the riboflavin are pharmacodynamically-objectionable; and some of these substances must be employed in objectionably high proportion to attain the desired riboflavin solubility. [By "pharmacodynamically-objectionable" is meant, of course, that the substance has an objectionable action in the body when administered in the amount required to solubilize the riboflavin.]

It is the object of this invention to provide improved, relatively high-concentration parenteral solutions of 9-polyhydroxyalkyl-iso-alloxazins, especially riboflavin, and a method of preparing them.

It has been found that 9-polyhydroxyalkyl-iso-alloxazins can be solubilized by treating them in water with indoles (i. e., indole and derivatives thereof containing the indole nucleus), that the relatively high-concentration solutions thus obtainable are stable, and that—provided the indole is pharmacodynamically-unobjectionable—these solutions are suitable for parenteral administration. Riboflavin concentrations of the order of 1.0% are readily obtainable by such solubilization. Thus, with a 10% aqueous solution of the sodium salt of acetyl-tryptophan (at pH 6) as the solvent, a riboflavin concentration of about 12,000 micrograms per ml. may be attained, which solution does not deposit riboflavin even when chilled to 2° C.; and with intermediate-concentration aqueous solutions of the sodium salt of acetyl-tryptophan as the solvent, e. g., 2% and 5% (each at pH 6), solutions containing respectively about 2,000 and 5,000 micrograms of riboflavin per ml. may be attained. The preferred indoles are those, such as the sodium salt of acetyl-tryptophan, which are pharmacodynamically-inactive, i. e., have no appreciable action in the body (other than nutritional).

The improved, relatively high-concentration parenteral solutions of 9-polyhydroxyalkyl-iso-alloxazins of this invention essentially comprise a 9-polyhydroxyalkyl-iso-alloxazin (preferably riboflavin), water, and a pharmacodynamically-unobjectionable indole (preferably the sodium salt of acetyl-tryptophan), the 9-polyhydroxyalkyl-iso-alloxazin being in a concentration higher than that obtainable in the absence of the indole. The method of this invention comprises heating the 9-polyhydroxyalkyl-iso-alloxazin and the pharmacodynamically-unobjectionable indole in water to such temperature and/or for such time as required to effect solubilization.

The compositions of this invention may (and preferably do) contain one or more additional therapeutic—especially vitaminic—components, inter alia, thiamine hydrochloride, niacinamide, and liver extract. Some of these additional components are solubilizing agents for 9-polyhydroxyalkyl-iso-alloxazins, and may act as such in the compositions of this invention; but inasmuch as the concentration of 9-polyhydroxyalkyl-iso-alloxazin specified for the compositions of this invention is higher than that obtainable in the absence of the indole, the solubilizing action of the indole is utilized regardless of the inclusion of these additional solubilizing agents.

The indoles preferred for the purposes of this invention are the pharmacodynamically-unobjectionable compounds of the general formula

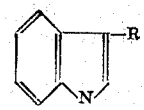

where R is a member of the group consisting of H and aliphatic radicals, inter alia l-tryptophan
dl-tryptophan
Acetyl-tryptophan
N-methyl-tryptophan
dl-indole lactate
Indoleacetic acid
β-Indolepyruvic acid
β-Indolyl-propionic acid
β-Indolyl-butyric acid
β-Indoleacrylic acid The acidic indoles listed hereinabove, partially or wholly neutralized with alkali The pharmacodynamically-unobjectionable alkali salts (i. e., alkali-metal, alkaline-earth-metal, and ammonium salts) of the acids of the general formula

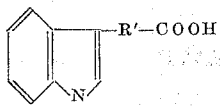

where R' is a divalent aliphatic residue are especially suitable for the purposes of this invention.

The sodium salt of acetyl-tryptophan is preferred because it is inexpensive, has a relatively high solubility, has no odor, and is a physiologically-desirable compound assimilated in the same manner as tryptophan (the latter being a natural amino acid present in all proteins which are nutritionally adequate, and essential for the growth of mammals).

It is believed that the solubilizing action of the indoles on the 9-polyhydroxyalkyl-iso-alloxazins is due to the formation of a loose compound or complex, which compound or complex in the body is capable of yielding, or has the effect of, the 9-polyhydroxyalkyl-iso-alloxazin. Thus, each of the indoles has the same molar solubilizing effect; e. g., an aqueous solution of one mol of partially-neutralized acetyl-tryptophan will dissolve the same amount of riboflavin as an aqueous solution of one mol of indoleacetic acid (at the same pH); moreover, unlike the solubility of riboflavin in water alone, the solubility of riboflavin in an aqueous solution of an indole is as great at 2° C. as at 37° C. or greater (which, incidentally, assures that riboflavin solutions of this invention will not crystallize out at low temperature). However, it is not intended that this invention be limited by any theoretical explanation.

The indoles are, in general, soluble in hot water and very slightly soluble in cold water. Accordingly, heating is generally required to form the relatively high-concentration solutions of 9-polyhydroxyalkyl-iso-alloxazins; and any heat-sensitive components desired (e. g., thiamine hydrochloride) must be included after cooling the solution.

The solubility of acetyl-tryptophan (and hence the concentration of 9-polyhydroxyalkyl-iso-alloxazin attainable) varies with the pH. An acid pH (especially below about 5.5) is preferred where the solution is to contain thiamine hydrochloride.

The invention is applicable generally to solutions of 9-polyhydroxyalkyl-iso-alloxazins, inter alia, 6,7-dimethyl-9-1-arabityl-iso-alloxazin and 6,7 - dimethyl - 9 - d - ribityl-iso-alloxazin (riboflavin).

The following examples are illustrative of the invention:

*Example 1*

100 g. acetyl-tryptophan and 5 g. chlorobutanol are added to sufficient water to make one liter of solution, and the pH is adjusted to 6.0 by means of sodium hydroxide. Then 12 g. riboflavin is added, and the mixture is heated to 90° C. and held at that temperature for a short time (until the riboflavin is dissolved). The solution is then cooled to room temperature, filtered clear, packaged in ampules (either single-dose flame-sealed or multiple-dose rubber-capped), and rendered sterile (e. g., by heating). All operations, and the filled and sterilized ampules, are preferably protected from light, as riboflavin is decomposed thereby.

The resulting composition is a stable solution, suitable for parenteral administration in the treatment of conditions involving a severe deficiency of riboflavin. The chlorobutanol used is not an essential component of the solution, being included as a preservative when the solution is to be packaged in multiple-dose ampules.

*Example 2*

A stable solution containing per ml.:

|  | mg. |
|---|---|
| Riboflavin | 10 |
| Thiamine hydrochloride | 50 |
| Niacinamide | 100 |
| Acetyl-tryptophan | 100 | is obtained as follows: the acetyl-tryptophan is added to the water; the pH is adjusted to 5.0 by means of sodium hydroxide; the riboflavin and niacinamide are added; the mixture is heated (to about 80–85° C.) to effect solution; the solution is cooled to room temperature; and the thiamine hydrochloride is added. The solution is then sterile-filtered, and packaged in ampules.

The thus-obtained solution is suitable for parenteral administration in the treatment of conditions involving a severe deficiency of riboflavin as well as of thiamine hydrochloride and niacinamide.

*Example 3*

A stable solution containing per ml.:

|  | mg. |
|---|---|
| Riboflavin | 9 |
| Thiamine hydrochloride | 9 |
| Niacinamide | 45 |
| Acetyl-tryptophan | 90 | is prepared in the same manner as that in Example 2. This solution is a more balanced vitaminic preparation than that described in Example 2, supplying per ml. three times the daily minimum requirement of each of the three vitamins.

*Example 4*

A stable solution containing per ml.:

|  | Mg. |
|---|---|
| Riboflavin | 10 |
| Thiamine hydrochloride | 10 |
| Niacinamide | 100 |
| Acetyl-tryptophan | 80 |
| Liver extract (solids) | 300 | is prepared in the same manner as that in Example 2, using an aqueous extract of mammalian liver (containing the vitamin-B-complex and antianemia fractions of the liver) in place of the water in the procedure described in Example 2.

The invention has been illustrated in the foregoing examples only in connection with the preferred solubilization with the sodium salt of acetyl-tryptophan; but inasmuch as the provision of additional examples requires merely replacing the acetyl-tryptophan by equimolecular amounts of other pharmacodynamically-unobjectionable indoles at the same pH, inter alia, indoleacetic acid and tryptophan, no further exemplification appears to be required.

The invention may be variously otherwise embodied within the scope of the appended claims.

We claim:

1. A parenteral solution essentially comprising water, a pharmacodynamically - unobjectionable indole, and a 9-polyhydroxyalkyl-iso-alloxazin in a concentration higher than that obtainable in the absence of the indole.

2. A parenteral solution essentially comprising water, a pharmacodynamically - unobjectionable indole, and riboflavin in a concentration higher than that obtainable in the absence of the indole.

3. A parenteral solution essentially comprising water, a pharmacodynamically - unobjectionable alkali salt of an acid of the general formula

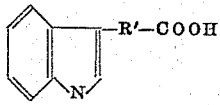

where R' is a divalent aliphatic residue, and riboflavin in a concentration higher than that obtainable in the absence of said salt.

4. A parenteral solution essentially comprising water, the sodium salt of acetyl-tryptophan, and riboflavin in a concentration higher than that obtainable in the absence of said salt.

5. A parenteral solution essentially comprising water, a pharmacodynamically - unobjectionable indole, and riboflavin in a concentration higher than that obtainable in the absence of the indole, the concentration being of the order of 1.0%.

TILLMAN D. GERLOUGH.
EMIL L. SMITH.

REFERENCES CITED

The following references are of record in the file of this patent:

UNITED STATES PATENTS

| Number | Name | Date |
| --- | --- | --- |
| 2,256,604 | Auhagen | Sept. 23, 1941 |
| 2,349,986 | Preiswerk | May 30, 1944 |
| 2,388,261 | Frost | Nov. 6, 1945 |

OTHER REFERENCES

New Modern Drugs, Jan. 1943, 9th supplement, pages 20, 22.